United States Patent [19]

Iida et al.

[11] Patent Number: 4,564,604

[45] Date of Patent: Jan. 14, 1986

[54] CATALYST FOR TREATING WASTE GASES

[75] Inventors: Kozo Iida; Yoshiaki Obayashi, both of Kanonshin, Japan

[73] Assignee: Mitsubishi Jukogyo Kabushiki Kaisha, Tokyo, Japan

[21] Appl. No.: 671,698

[22] Filed: Nov. 15, 1984

[30] Foreign Application Priority Data

Nov. 16, 1983 [JP] Japan .............................. 58-214028

[51] Int. Cl.$^4$ ........................ B01J 29/08; B01J 29/18; B01J 29/28
[52] U.S. Cl. ........................................ 502/64; 502/77; 502/78; 502/79; 423/239
[58] Field of Search ...................... 502/78, 79, 77, 64; 423/239 A; 55/75

[56] References Cited

U.S. PATENT DOCUMENTS

| 4,046,888 | 9/1977 | Maeshima et al. | 423/239 A |
| 4,048,112 | 9/1977 | Matsushita et al. | 423/239 A |
| 4,246,141 | 1/1981 | Hass et al. | 502/78 |

FOREIGN PATENT DOCUMENTS 12690  1/1977  Japan .............................. 423/239 A

*Primary Examiner*—Carl F. Dees
*Attorney, Agent, or Firm*—Toren, McGeady, Stanger, Goldberg & Kiel

[57] ABSTRACT

A catalyst for treating waste gases comprising nitrogen oxides, which catalyst comprises a protonized zeolite coating formed on the surface of a catalytic ingredient. This type of catalyst has a prolonged life and is very useful in treating waste gases comprising nitrogen oxides by adding ammonia to the waste gas and reducing the nitrogen oxides in the waste gas with the catalyst to render the nitrogen oxides non-noxious.

4 Claims, 4 Drawing Figures

CATALYST FOR TREATING WASTE GASES

BACKGROUND OF THE INVENTION

1. Field of the Invention

This invention relates to catalysts for treating waste gases comprising nitrogen oxides. More particularly, the invention relates to prolongation in life of catalysts of the type which is very useful when applied to a process of treating waste gases comprising nitrogen oxides (hereinafter referred to simply as NOx) in which after addition of ammonia to the waste gas, NOx in the waste gas is suitably reduced with the catalyst into non-noxious gases.

2. Description of the Prior Art

As is well known in the art, waste gases from combustion furnaces such as large-size boilers for use in electric power plants and boilers for independent electric power plants, incinerators and chemical plants comprise NOx. Air pollution with NOx is one of serious social problems to solve. To this end, there have been developed a number of apparatus for the denitrification of waste gases. At present, selective catalytic reduction processes are predominantly used in which waste gases are treated in the presence of catalysts using ammonia as a reducing agent.

The catalysts used in the denitrifying apparatus should have not only high activity, but also a long-term performance stability.

According to our analysis of catalysts used in practical apparatus and various laboratory tests, it was found that denitrification catalysts deteriorated in performance by accumulation of alkali metal components such as Na and K contained in waste gas dust with an attendant shortage of the catalyst life.

SUMMARY OF THE INVENTION

The present invention is accomplished as a result of extensive studies made to reduce a degree of lowering of the catalytic performance caused by accumulation of the alkali metal components.

According to the present invention, there is provided a catalyst for treating waste gases comprising NOx which comprises an active metal-free protonized zeolite coating on a surface of any known catalyst for these purposes in a predetermined thickness whereby the alkali metal contained in waste gas dust are collected with the coating to suppress poisoning of catalytic active ingredients, thus prolong the life of the ingredients. More particularly, there is provided a catalyst for treating waste gases comprising nitrogen oxides by a process which comprises adding ammonia to the waste gas and reducing the nitrogen oxides with catalytic ingredients of the catalyst to convert the nitrogen oxides into nonnoxious compounds, the catalyst comprising catalytic ingredients for nitrogen oxides and a coating formed on the catalytic ingredients and consisting of a protonized zeolite. The coating is preferably in a thickness of from 10 to 50 $\mu$m.

DETAILED DESCRIPTION OF THE INVENTION

The zeolite being coated on the catalyst according to the invention may be any of zeolite X, zeolite Y, mordenite and zeolite ZSM-5. These zeolites are used after protonization in a manner as will be particularly described in examples appearing hereinafter. The thickness of the coating is favorably over 10 $\mu$m, inclusive, because too thin a coating does not show a satisfactory effect. On the other hand, when the coating is too thick, the initial activity of the catalytic ingredients lowers and is not thus favorable. In this connection, catalysts which are currently employed for these purposes allow NOx and $NH_3$ to proceed very rapidly, so that the thickness may be up to about 50 $\mu$m within which the initial activity is not impeded significantly.

The catalytic ingredients useful in the practice of the invention may be any known ingredients and include, for example, $V_2O_5$, $WO_3$, $MoO_3$, $Cr_2O_3$ and mixtures thereof, preferably, supported on a suitable carrier such as $TiO_2$, $Al_2O_3$ and the like.

The present invention is more particularly described by way of examples.

EXAMPLE 1

Na-X type zeolite was ion-exchanged with an aqueous $NH_4Cl$ solution and sintered at 500° C. for protonization. The resulting zeolite was dispersed in water to obtain an aqueous slurry, followed by coating onto a catalyst of 1 wt% of $V_2O_5$ and 8 wt% of $WO_3$ supported on $TiO_2$ (anatase) in different thicknesses of 5, 10, 20, 30, 50 and 70 $\mu$m. The resulting catalysts were subjected to initial activity and life tests. The test results are shown in FIG. 1 in comparison with the results of a coating-free catalyst.

Figure 1:
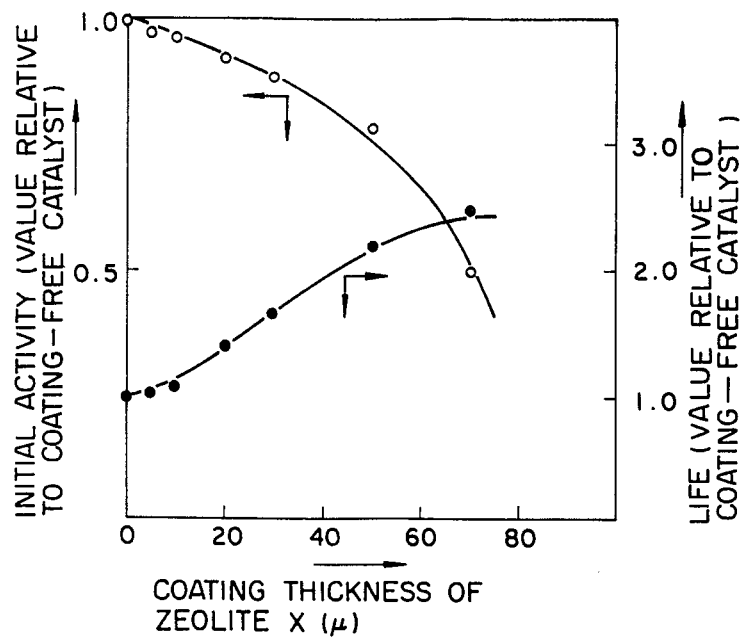
FIGS. 1 through 4 are graphical representations of initial activity and life of catalysts of the present invention (indicated as values relative to values of coating-free catalysts) in relation to the coating thickness.

As will be seen from FIG. 1, the life of the coated catalysts remarkably increases by the coating of the protonized zeolite X.

EXAMPLE 2

The general procedure of Example 1 was repeated using protonized zeolite Y in thicknesses of 5, 10, 20, 30, 50 and 70 $\mu$m. The results of the initial activity and life tests are shown in FIG. 2 in comparison with the results of a coating-free catalyst.

Figure 2:
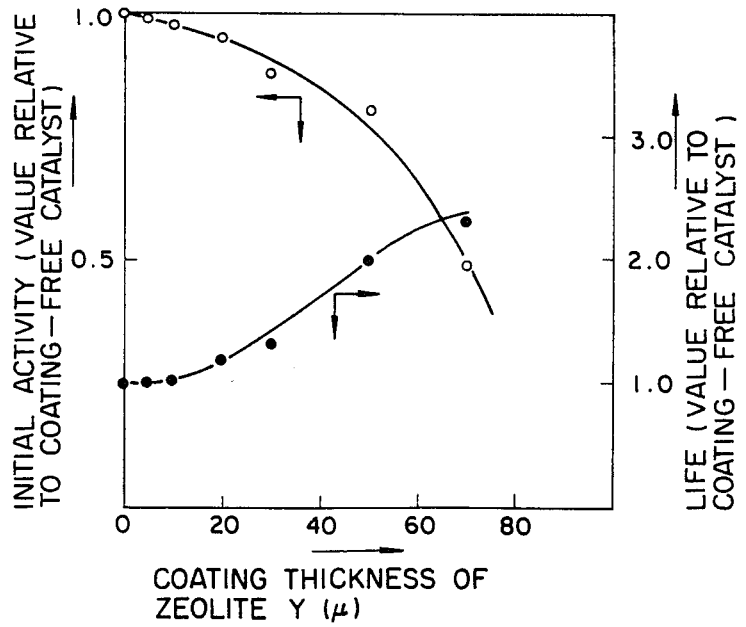

As will be seen from FIG. 2, the life of the coated catalysts significantly increases by the coating of the protonized zeolite Y.

EXAMPLE 3

The general procedure of Example 1 was repeated except that zeolite ZSM-5 was protonized by treatment with HCl solution and coated in thicknesses of 5, 10, 20, 30, 50 and 70 $\mu$m. The initial activity and life tests were carried out.

Figure 3:
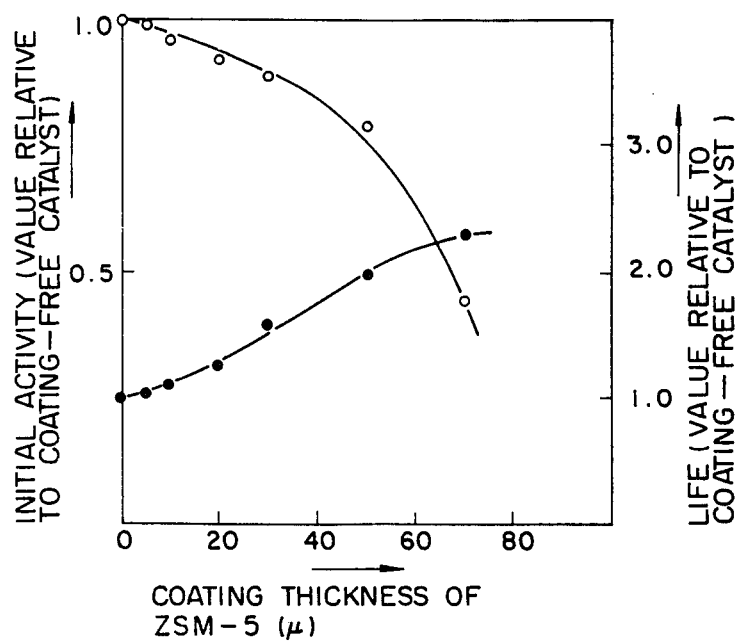

The results in comparison with the results of a coating-free catalyst are shown in FIG. 3, revealing that the life of the coated catalysts remarkably increases as compared with the life of the coating-free catalyst.

EXAMPLE 4

The general procedure of Example 1 was repeated except that mordenite was protonized in the same manner as in xample 1 and coated on a catalyst of 10 wt% of $V_2O_5$ on alumina in thicknesses of 10, 30, 50 and 70 $\mu$m. The respective catalysts were subjected to the initial activity and life tests.

Figure 4:
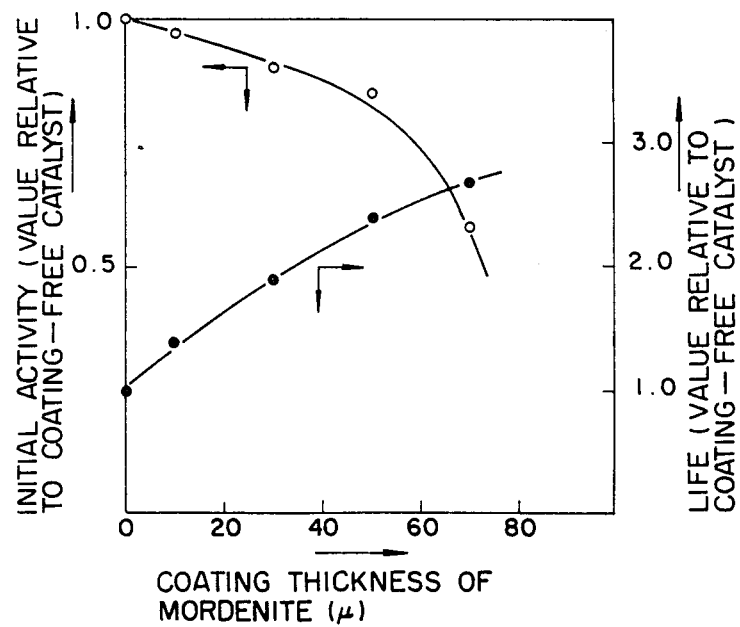

The results of the tests are shown in FIG. 4 in comparison with the results of the coating-free catalyst, revealing that the life of the coated catalysts remarkably increases.

EXAMPLE 5

Protonized zeolites indicated in Table 1 were coated on catalysts indicated in Table 1 in thicknesses indicated in Table 1 to obtain coated catalysts. These coated catalysts were subjected to the initial activity and life tests with the results shown in Table 1.

As will be seen from Table 1, all the coated catalysts show remarkably prolonged life though slightly lowering with respect to the initial activity.

TABLE 1

Effects of Zeolite Coatings on the Life of Denitrifying Catalysts

| Catalyst | Kind of Zeolite | Coating Thickness ($\mu$m) | Initial Activity *1 | Life *1 |
|---|---|---|---|---|
| 10 wt % $WO_3/TiO_2$ | Y type | 40 | 0.86 | 1.8 |
| " | ZSM-5 | 40 | 0.88 | 1.9 |
| " | mordenite | 40 | 0.85 | 1.7 |
| 15 wt % $MoO_3/TiO_2$ | Y type | 40 | 0.87 | 1.6 |
| " | ZSM-5 | 40 | 0.87 | 1.7 |
| " | mordenite | 40 | 0.86 | 1.6 |
| 5 wt % $V_2O_5/TiO_2$ | X type | 50 | 0.85 | 2.0 |
| " | mordenite | 50 | 0.85 | 2.0 |
| " | Y type | 50 | 0.87 | 1.9 |
| 12 wt % $Cr_2O_3/Al_2O_3$ | Y type | 30 | 0.92 | 1.5 |
| " | mordenite | 30 | 0.93 | 1.5 |

Note
*1 The activity and life are indicated as an index to a coating-free catalyst.

What is claimed is:

1. A catalyst for treating waste gases comprising nitrogen oxides by a process which comprises adding ammonia to the waste gas and reducing the nitrogen oxides with catalytic ingredients of the catalyst to render the nitrogen oxides into non-noxious compounds, the catalyst comprising a catalytic ingredient for nitrogen oxides and a coating formed on the catalytic ingredient and consisting of a protonized zeolite.

2. The catalyst according to claim 1, wherein said coating is in a thickness of from 10 to 50 $\mu$m.

3. The catalyst according to claim 1, wherein said zeolite is zeolite X, zeolite Y, zeolite ZSM-5 or mordenite.

4. The catalyst according to claim 1, wherein said catalytic ingredient is supported on a carrier.

* * * * *